US011541546B2

(12) United States Patent
Fernando et al.

(10) Patent No.: US 11,541,546 B2
(45) Date of Patent: Jan. 3, 2023

(54) SENSATION IMPARTING DEVICE, ROBOT CONTROL SYSTEM, AND ROBOT CONTROL METHOD

(71) Applicant: Telexistence Inc., Tokyo (JP)

(72) Inventors: Charith Lasantha Fernando, Tokyo (JP); Susumu Tachi, Tokyo (JP); Genki Sano, Tokyo (JP); Kouta Minamizawa, Tokyo (JP)

(73) Assignee: TELEXISTENCE INC., Tokyo (JP)

( * ) Notice: Subject to any disclaimer, the term of this patent is extended or adjusted under 35 U.S.C. 154(b) by 615 days.

(21) Appl. No.: 16/684,624

(22) Filed: Nov. 15, 2019

(65) Prior Publication Data

US 2020/0078950 A1 Mar. 12, 2020

Related U.S. Application Data

(63) Continuation of application No. PCT/JP2018/018883, filed on May 16, 2018.

(30) Foreign Application Priority Data

May 17, 2017 (JP) .............................. JP2017-098532

(51) Int. Cl.
 *B25J 9/16* (2006.01)
 *B25J 3/00* (2006.01)
 *B25J 19/02* (2006.01)

(52) U.S. Cl.
 CPC .............. *B25J 9/1694* (2013.01); *B25J 3/00* (2013.01); *B25J 19/02* (2013.01)

(58) Field of Classification Search
 CPC ............. B25J 9/1694; B25J 3/00; B25J 19/02
 See application file for complete search history.

(56) References Cited

U.S. PATENT DOCUMENTS 10,628,996 B2 * 4/2020 Kass ...................... G06T 15/506
2011/0306968 A1 * 12/2011 Beckman ............ A61B 18/1482
606/41

(Continued)

FOREIGN PATENT DOCUMENTS

JP 62-029196 6/1987
JP 2001-025986 1/2001

(Continued)

OTHER PUBLICATIONS

International Preliminary Report on Patentability dated Nov. 28, 2019, 8 pages.

(Continued)

*Primary Examiner* — Kira Nguyen
(74) *Attorney, Agent, or Firm* — Rankin, Hill & Clark LLP

(57) ABSTRACT

According to the present invention, a terminal device has: a transmission unit which transmits, to a robot, operator state information indicating the state of a user operating the robot; a receiving unit which receives, from the robot, robot state information indicating the state of the robot; a sensation imparting unit which imparts a predetermined sensation to the user; and a control unit which, when a delay time required for the receiving unit to receive the robot state information after the transmission unit transmits the operator state information is no longer than a predetermined time, controls the sensation imparting unit so as to impart a sensation based on the robot state information to the user, and when the delay time is longer than the predetermined time, controls the sensation imparting unit to impart, to the user, a sensation based on virtual state information that indicates an estimated robot state.

12 Claims, 8 Drawing Sheets

(56) References Cited

U.S. PATENT DOCUMENTS

| | | |
|---|---|---|
| 2011/0306986 A1 | 12/2011 | Lee et al. |
| 2013/0282179 A1* | 10/2013 | Jacob ................. G16H 50/20 |
| | | 700/257 |
| 2017/0345398 A1* | 11/2017 | Fuchs ............... G02B 27/0101 |

FOREIGN PATENT DOCUMENTS

| | | |
|---|---|---|
| JP | 2005-177958 | 7/2005 |
| JP | 2015-047666 | 3/2015 |

OTHER PUBLICATIONS

Design of Telesar V for Transferring Bodily Consciouness in Telexistence, Charith Lasantha Fernando et al., 2012 IEEE/RSJ International Conference on Intelligent Robots and Systems, pp. 5112-5118, Oct. 7-12, 2012, Vilamoura, Algarve, Portugal, 7 pages.

International Search Report of PCT/JP2018/018883, dated Jul. 31, 2018, 2 pages.

Written Opinion of PCT/JP2018/018883, dated Jul. 31, 2018, 4 pages.

European Search Report dated Feb. 8, 2021, 9 pages.

Kim, et al., "Experiments with a Predictive Display and Shared Compliant Control for Time-Delayed Teleoperation", Proceedings of the Annual Conference of the Engineering in Medicine and Biology Society, vol. 12, No. 5, 1990, 3 pages.

Artigas, et al., "Time Domain Passivity for Delayed Haptic Telepresence with Energy Reference", Intelligent Robots and Systems, 2007, 6 pages.

* cited by examiner

SENSATION IMPARTING DEVICE, ROBOT CONTROL SYSTEM, AND ROBOT CONTROL METHOD

CROSS-REFERENCE TO RELATED APPLICATIONS

The present application is a continuation application of International Application No. PCT/JP2018/018883, filed on May 16, 2018, which claims priority to Japanese Patent Application No. 2017-098532, filed on May 17, 2017. The contents of these applications are incorporated herein by reference in their entirety.

BACKGROUND OF THE INVENTION

The present invention relates to a sensation imparting apparatus, a robot control system, and a robot control method.

Telexistence is known as a subset of virtual reality. Telexistence is also said to be a technique that allows a person to have a sense of remote reality or remote presence. Telexistence provides an environment in which a user takes an action, through an avatar robot, to an object or person at a remote location in real time while making the user feel as if the object or person is nearby.

In order to operate a robot in real time through a network by telexistence, a high-speed network is required, and the network is required to have a very low latency and not to lose data. However, depending on the network in which data is transmitted, transmission delay or loss of data may occur.

In a case where data to be transferred is one piece of data transmitted in one direction, an influence of the transmission delay and the loss of data can be reduced by temporarily storing the data and stream in a buffer using a streaming algorithm that dynamically controls the rate. Also, by using streaming protocols such as Web Real-Time Communication (WebRTC) or HTTP Live Streaming (HLS), high-quality audio and video media can be transmitted synchronously in one direction.

The technology concerning remote control is disclosed in, for example, Japanese Examined Patent Application Publication No. S62-29196 and Charith Lasantha Fernando, Masahiro Furukawa, Tadatoshi Kurogi, Sho Kamuro, Katsunari Sato, Kouta Minamizawa and Susumu Tachi, "Design of TELESAR V for Transferring Bodily Consciousness in Telexistence", 2012 IEEE/RSJ International Conference on Intelligent Robots and Systems (Portugal), Oct. 7-12, 2012.

In telexistence, it is necessary to transmit or receive multiple media streams bi-directionally and synchronously among a plurality of endpoints on the Internet in order to enable a user to operate a robot as if he/she were in the robot. The plurality of pieces of media may be, for example, motion data, audio data, video data, or tactile data.

In the related art, in a case where a delay occurs between an operation of a robot operator and an action of a robot in telexistence, the control of the robot may become difficult. For example, if the delay is large, the situation assumed by the operator does not coincide with the situation visually recognized by the operator through an image capturing device provided in the robot, which causes dizziness in the operator, making it difficult for the operator to continue controlling the robot.

The delay is, for example, a delay generated in data communication via networks, a delay generated by performing data encoding and decoding processing, a delay generated by performing Analog to Digital (A/D) transform processing on data (for example, a delay due to sampling), a mechanical delay, or the like.

BRIEF SUMMARY OF THE INVENTION

This invention focuses on these points, and an object of the present invention is to provide a sensation imparting apparatus, a robot control system, and a robot control method capable of improving operability in telexistence.

A sensation imparting apparatus according to the first aspect of the present invention comprises a transmission part that transmits operator state information indicating a state of an operator operating a robot to the robot, a reception part that receives robot state information indicating a state of the robot from the robot, a sensation imparting part that imparts a predetermined sensation to the operator, and a control part that controls the sensation imparting part to impart a sensation based on the robot state information to the operator if a delay time required from when the transmission part transmits the operator state information to when the reception part receives the robot state information is equal to or shorter than a predetermined time period, and controls the sensation imparting part to impart a sensation based on virtual state information indicating an estimated state of the robot to the operator if the delay time is longer than the predetermined time period.

A robot control system according to the second aspect of the present invention comprises a sensation imparting apparatus that transmits, to a network, operator state information indicating a state of an operator operating a robot, a robot control apparatus that controls the robot on the basis of the operator state information received via the network, and a management apparatus that is capable of communicating with the robot control apparatus and the sensation imparting apparatus via the network. The sensation imparting apparatus includes a transmission part that transmits the operator state information indicating the state of the operator operating the robot to the robot, a reception part that receives robot state information indicating a state of the robot from the robot, a sensation imparting part that imparts a predetermined sensation to the operator, and a control part that controls the sensation imparting part to impart a sensation based on the robot state information to the operator if a delay time required from when the transmission part transmits the operator state information to when the reception part receives the robot state information is equal to or shorter than a predetermined time period, and controls the sensation imparting part to impart a sensation based on virtual state information indicating an estimated state of the robot to the operator if the delay time is longer than the predetermined time period. The management apparatus includes a delay specification part that specifies the delay time, and a notification part that notifies the control part about the delay time specified by the delay specification part.

A robot control method according to the third aspect of the present invention, the method comprises the computer-implemented steps of transmitting operator state information indicating a state of an operator operating a robot to the robot, determining whether or not a delay time required from transmitting the operator state information to receiving robot state information indicating a state of the robot is equal to or less than a predetermined time period, and imparting a sensation based on the robot state information to the operator if the delay time is equal to or less than the predetermined time period, and imparting a sensation based on virtual state

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Outline of a Robot System]

Figure 1:
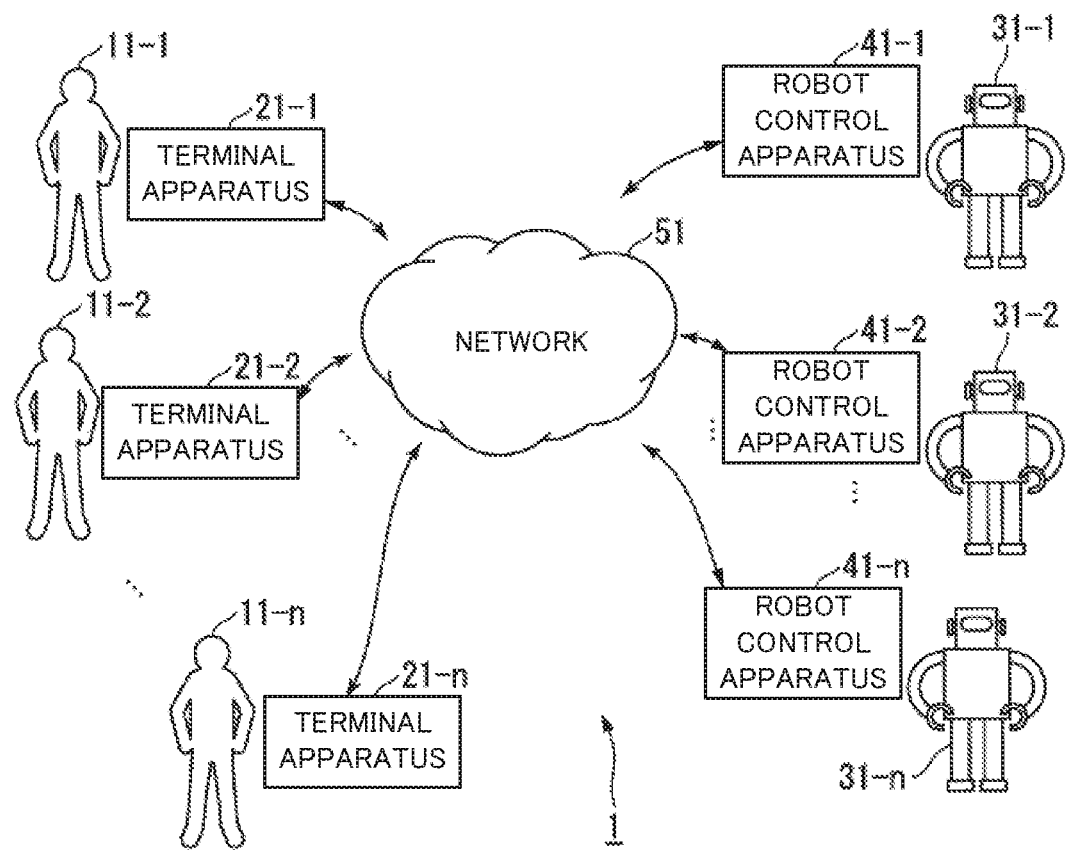
FIG. 1 is a block diagram illustrating a schematic configuration of a robot system according to an embodiment of the present invention.

FIG. 1 is a block diagram illustrating a schematic configuration of a robot system 1 according to an embodiment of the present invention. The robot system 1 includes n (n is an integer of 2 or more) terminals 21-1 to 21-$n$, n robots 31-1 to 31-$n$, n robot control apparatuses 41-1 to 41-$n$, and a network 51. The network 51 is, for example, the Internet, or may be any other network. The network 51 may be, for example, a wired network, a wireless network, or a network including both wired and wireless networks.

FIG. 1 shows n users 11-1 to 11-$n$ and n robots 31-1 to 31-$n$ (n is an integer of 1 or more). The robots 31-1 to 31-$n$ include, for example, a totally humanoid robot or a partially humanoid robot. A partially humanoid robot is a robot in which a part of the entire body is humanoid and another part is not humanoid, the part being, for example, an upper body part, a lower body part, or an arm part. Each of the robots 31-1 to 31-$n$ may be any other form of robot. The robots 31-1 to 31-$n$ may have, for example, a robot operating system (ROS) function.

Here, in the example of FIG. 1, the respective users 11-1 to 11-$n$ and the respective terminal apparatuses 21-1 to 21-$n$ are associated with each other. Further, in the example of FIG. 1, the respective robots 31-1 to 31-$n$ and the respective robot control apparatuses 41-1 to 41-$n$ are associated with each other. Furthermore, in the example of FIG. 1, the respective terminal apparatuses 21-1 to 21-$n$ and the respective robot control apparatuses 41-1 to 41-$n$ are associated with each other. Thus, in the example of FIG. 1, one user 11-$i$ (i is any integer of 1≤i≤n), one terminal apparatus 21-$i$, one robot 31-$i$, and one robot control apparatus 414 are associated with each other.

In the embodiment, then terminal apparatuses 21-1 to 21-$n$ have the same function, the n robot control apparatuses 41-1 to 41-$n$ have the same function, and the n robots 31-1 to 31-$n$ have the same function. Also, the n users 11-1 to 11-$n$ are different persons, but have the same function in that they operate the corresponding robots 31-1 to 31-$n$. Therefore, a combination of a user 11-1, a terminal apparatus 21-1, a robot 31-1, and a robot control apparatus 41-1 will be described as an example below.

[Outline of a Terminal Apparatus]

Figure 2:
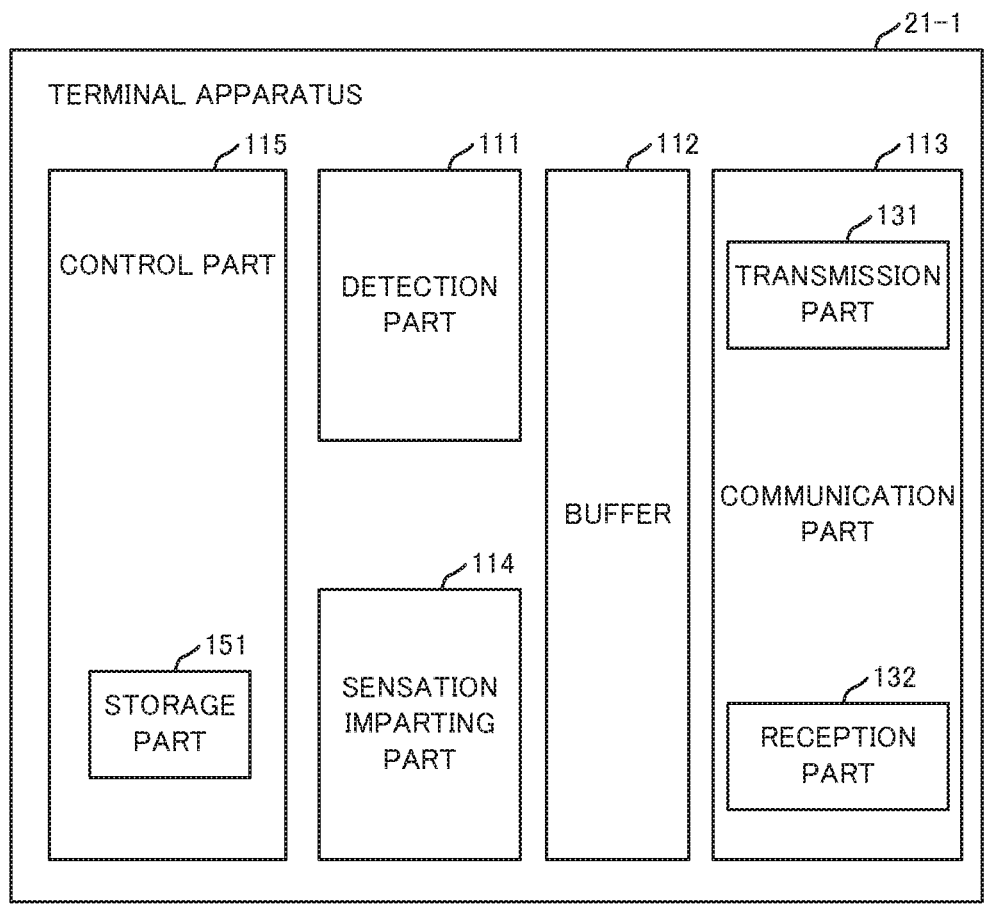
FIG. 2 is a block diagram illustrating a schematic configuration of a terminal apparatus according to the embodiment of the present invention.

FIG. 2 is a block diagram illustrating a schematic configuration of the terminal apparatus 21-1 according to the embodiment of the present invention. The terminal apparatus 21-1 detects a state of the user 11-1 and also functions as a sensation imparting apparatus for imparting various types of sensations to the user 11-1. The sensation imparted by the terminal apparatus 21-1 to the user 11-1 is arbitrary, but is, for example, a visual, auditory, tactile, or force sensation. The terminal apparatus 21-1 imparts a sensation based on a state of the robot 31-1 acquired via the robot control apparatus 41-1 to the user 11-1.

The terminal apparatus 21-1 includes a detection part Iii, a buffer 112, a communication part 113, a sensation imparting part 114, and a control part 115. The communication part 113 includes a transmission part 131 and a reception part 132. The control part 115 includes a storage part 151 including a read only memory (ROM) and a random access memory (RAM).

The detection part 111 detects the state of the user The state detected by the detection part 111 is, for example, a motion of fingers of the user 11-1, a motion of a torso of the user 11-1, or a motion of eyes (for example, a line of sight) of the user 11-1.

The detection part 111 includes, for example, a sensor for detecting a state of a detection target. The detection part 111 includes, for example, a sensor for a head, a sensor for fingers, and a sensor for a torso. The sensor for the head is provided in, for example, a head-mounted display that provides a video image and sound to the user 11-1. The head-mounted display includes, for example, a sensor for detecting the motion of the user's eyes (for example, a line of sight). The sensor may detect the motion of the left eye and the motion of the right eye separately.

The sensor may be, for example, a sensor in the form of a sensor attached to the user 11-1, or may be a sensor not attached to the user 11-1. The sensor not attached to the user 11-1 is, for example, an image capturing device (for example, a camera) that captures an image for example, a video image) of all or a part of the user 11-1.

The buffer 112 is a memory for temporarily storing data. In the embodiment, the buffer 112 has a function of temporarily storing data to be transmitted by the transmission part 131 and a function of temporarily storing data received by the reception part 132. A different buffer may be provided for each of these two functions. The buffer 112 temporarily stores one or more pieces of robot state information received by the reception part 132, and then sequentially outputs the one or more pieces of robot state information to the sensation imparting part 114. The robot state information is information indicating the state of the robot 31-1, and is information, for example, indicating an image captured by the robot 31-1, a pressure detected by the robot 31-1, or a temperature detected by the robot 31-1.

The buffer 112 temporarily stores operator state information indicating a state of an operator detected by the detection part 111, and then sequentially outputs one or more pieces of the operator state information to the transmission part 131 The operator state information is, for example, information indicating the position of the body of the user 11-1 detected by using a sensor attached by the user 11-1 to his/her body.

The communication part 113 communicates with the robot control apparatus 41-1 corresponding to the terminal apparatus 21-1. The communication part 113 communicates with the robot control apparatus 41-1 via the network 51. Also, the communication part 113 communicates via WebRTC. The communication part 113 can communicate at a high frame rate and with a low delay, for example, via WebRTC.

The transmission part 131 acquires the operator state information indicating the state of the user 11-1 operating the robot 31-1 from the buffer 112, and transmits the acquired operator state information to the robot 31-1. Specifically, the transmission part 131 transmits data to be transmitted including the operator state information to the robot control apparatus 41-1.

The reception part 132 receives the robot state information indicating the state of the robot 31-1 as data transmitted from the robot control apparatus 41-1. The reception part 132 inputs the received robot state information to the buffer 112.

The sensation imparting part 114 imparts a sensation based on the robot state information received by the reception part 132 to the user 11-1. That is, the sensation imparting part 114 imparts the sensation corresponding to the robot state information indicating the state of the robot 31-1 received by the reception part 132 to the user 11-1.

The sensation imparting part 114 includes, for example, a device for imparting a sensation to the user 11-1. For example, the sensation imparting part 114 may include a video display device for displaying an image (video) to impart a visual sensation to the user 11-1, a speaker for outputting sound (audio) to impart an auditory sensation to the user 11-1, and a motion generator for generating a pressure or a vibration (haptics) to impart a tactile sensation to the user 11-1. The video display device and the speaker are provided, for example, in a head device (such as a head-mounted display). The device for imparting the sensation to the user 11-1 may be a device attached to the user 11-i or a device not attached to the user 11-1. All or a part of the detection part 111 and the sensation imparting part 114 may be included in the same device.

The control part 115 performs various controls in the terminal apparatus 21-1. The control part 115 includes, for example, a central processing unit (CPU) and a storage part 151 for storing data. The control part 115 performs the various controls by executing programs stored in the storage part 151 using, for example, parameters stored in the storage part 151.

In the embodiment, the control part 115 can adjust the length of time for temporarily storing the data to be transmitted with the buffer 112, and can adjust the length of time for temporarily storing the received data with the buffer 112.

Here, the terminal apparatus 21-1 may be composed of a plurality of devices, and may include, for example, the detection part 111, the buffer 112, the communication part 113, the sensation imparting part 114, and the control part 115 shown in FIG. 2 in a distributed manner in two or more devices. Further, the transmission part 131 and the reception part 132 may be provided in different devices. For example, the terminal apparatus 211 may be configured by using a device including the detection part 111, a device including the sensation imparting part 114, and a device including the buffer 112, the communication part 113, and the control part 115. In addition, the device including the detection part 111 and the device including the sensation imparting part 114 may be partially or entirely integrated with each other.

[Outline of a Robot Control Apparatus]

Figure 3:
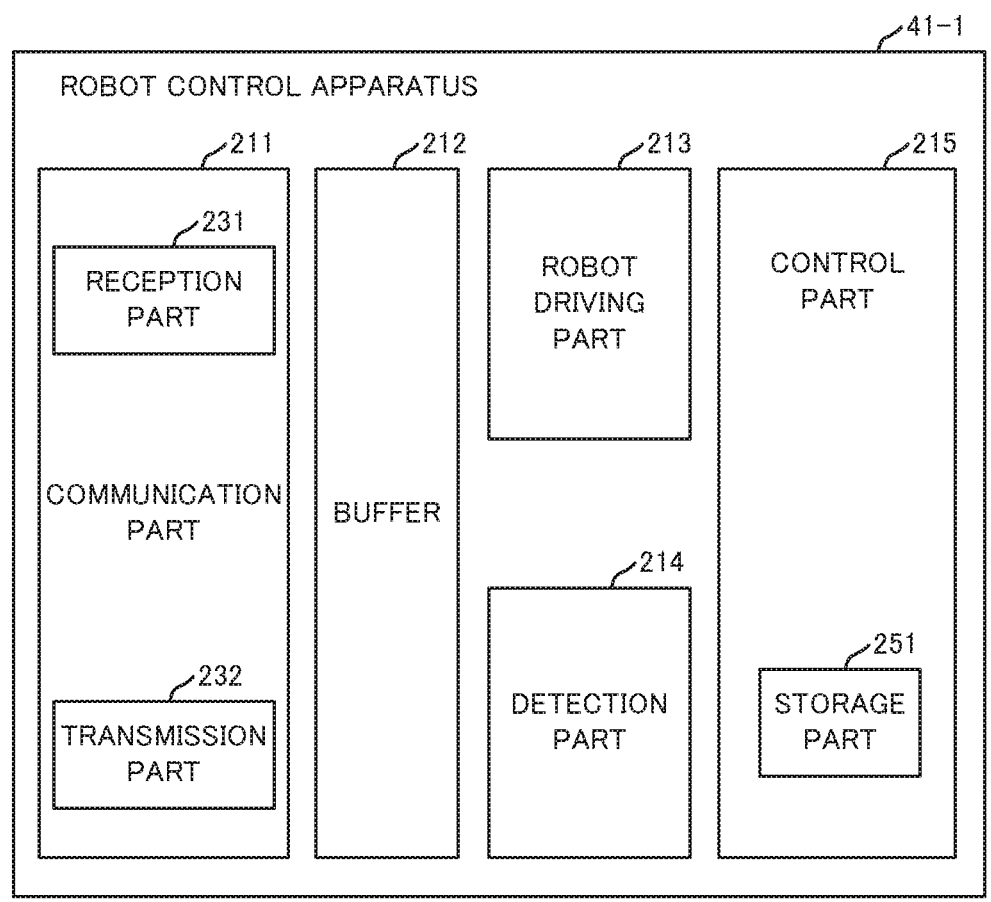
FIG. 3 is a block diagram illustrating a schematic configuration of a robot control apparatus according to the embodiment of the present invention.

FIG. 3 is a block diagram illustrating a schematic configuration of the robot control apparatus 41-1 according to the embodiment of the present invention. The robot control apparatus 41-1 includes a communication part 211, a buffer 212, a robot driving part 213, a detection part 214, and a control part 215. The communication part 211 includes a reception part 231 and a transmission part 232. The control part 215 includes a CPU and a storage part 251 including a ROM and a RAM.

The communication part 211 communicates with the terminal apparatus 21-1 corresponding to the robot control apparatus 41-1. In the embodiment, the communication part 211 communicates via the network 51. The communication part 211 communicates via WebRTC, for example. The reception part 231 receives data such as the operator state information transmitted from the terminal apparatus 21-1. The transmission part 232 transmits data such as the robot state information to be transmitted to the terminal apparatus 21-1.

The buffer 212 is a memory for temporarily storing data. In the embodiment, the buffer 212 has a function of temporarily storing the robot state information to be transmitted by the transmission part 232, and a function of temporarily storing the operator state information received by the reception part 231. It should be noted that the buffer 212 may have different buffers for each of these two functions.

The robot driving part 213 drives a driving part of the robot 31-1 corresponding to the robot control apparatus 41-1 on the basis of the operator state information received from the terminal apparatus 21-1. Here, the driving part of the robot 31-1 is, for example, a driving part for driving a head, a driving part for driving fingers, or a driving part for driving a torso.

The detection part 214 detects motion of the robot 31-1. The motion detected by the detection part 214 is, for example, the motion of the fingers of the robot 31-1, the motion of the torso of the robot 31-1, or the motion of the eyes (e.g., a line of sight) of the robot 31-1.

The detection part 214 includes, for example, the sensor for detecting the state of the detection target. As an example, the detection part 214 includes the sensor for the head, the sensor for the fingers, and the sensor for the torso. The sensor for the head is, for example, an image capturing device (a camera) for capturing a video image or a microphone for inputting a sound. For example, the detection part

214 may separately process the video image corresponding to the left eye and the video image corresponding to the right eye.

The sensor may be a sensor attached to the robot 31-1 or a sensor not attached to the robot 31-1. The sensor not attached to the robot 31-1 is, for example, an image capturing device which is installed in the vicinity of the robot 31-1 and captures an image (for example, a video image). Various types of data are captured by sampling using, for example, A/D conversion. In the embodiment, the data detected by the detection part 214 is the robot state information to be transmitted. It should be noted that all or a part of the robot driving part 213 and the detection part 214 may be, for example, included in the same device.

The control part 215 performs various controls in the robot control apparatus 41-*i*. The control part 215 includes, for example, a CPU and a storage part 251 for storing data. The control part 215 performs the various controls by, for example, executing programs stored in the storage part 251 using parameters stored in the storage part 251. In the embodiment, the control part 215 can adjust the length of time for temporarily storing data such as the robot state information to be transmitted in the butler 212, and can adjust the length of time for temporarily storing data such as the received operator state information in the buffer 212.

Here, the robot control apparatus 41-1 may be composed of a plurality of devices, and may include, for example, the communication part 211, the buffer 212, the robot driving part 213, the detection part 214, and the control part 215 shown in FIG. 3 in a distributed manner in two or more devices. Further, the reception part 231 and the transmission part 232 may be provided in different devices. For example, the robot control apparatus 41-1 may be configured using a device including the robot driving part 213, a device including the detection part 214, and a device including the communication part 211, the buffer 212, and the control part 215. In addition, the device including the robot driving part 213 and the device including the detection part 214 may be partially or entirely integrated with each other.

[Outline of an Operation in the Terminal Apparatus and the Robot Control Apparatus]

The terminal apparatus 21-1 detects the state of the user 11-1 with the detection part 111, and transmits the operator state information including the detected data to the robot control apparatus 41-1 via the network 51. The robot control apparatus 41-1 receives the operator state information transmitted from the terminal apparatus 21-1 via the network 51, and drives the robot 31-1 using the robot driving part 213 on the basis of the received operator state information. The robot 31-1 is driven and operated by the robot (hiving part 213 of the robot control apparatus 41-1.

The robot control apparatus 41-1 detects the state of the robot 31-1 by the detection part 214, and transmits the robot state information including the detected data to the terminal apparatus 21-1 via the network 51. The terminal apparatus 21-1 receives the robot state information transmitted from the robot control apparatus 41-1 via the network 51, and imparts the sensation to the user 11-1 with the sensation imparting part 114 on the basis of the received robot state information.

Here, in the embodiment, the terminal apparatus 21-1 and the robot control apparatus 41-1 are associated with each other before being used by the user 11-1 or when being used by the user 11-1. The terminal apparatus 21-1 stores information of the address of the robot control apparatus 41-1 corresponding to its own apparatus (the terminal apparatus 21-1), and the robot control apparatus 41-1 stores information of the address of the terminal apparatus 21-1 corresponding to its own apparatus (the robot control apparatus 41-1). Then, the terminal apparatus 21-1 and the robot control apparatus 41-1, which correspond to each other, communicate with each other as communication partners by using the stored address information, for example, by including the address information in a signal to be transmitted.

[The Terminal Apparatus and the Robot Control Apparatus: Adjusting Delay Time Using the Buffers]

Figure 4:
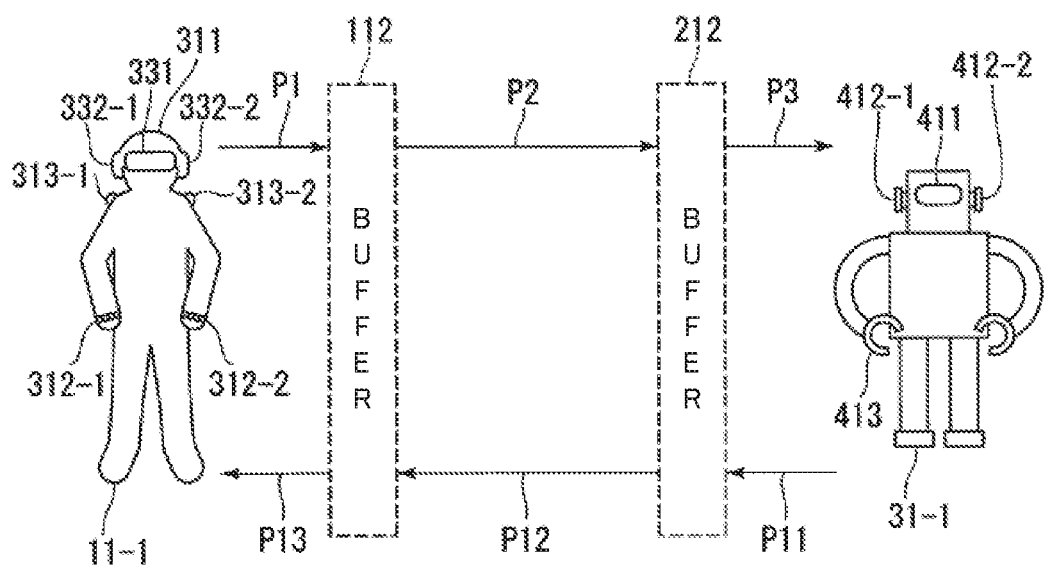
FIG. 4 is a diagram for explaining how to adjust delay time by buffers in a terminal apparatus and a robot control apparatus according to the embodiment of the present invention.

FIG. 4 is a diagram for explaining how to adjust delay time using buffers in the terminal apparatus 21-1 and the robot control apparatus 41-1 according to the embodiment of the present invention. FIG. 4 shows the user 11-1, a head device 311, finger devices 312-1 to 312-2, and torso devices 313-1 to 313-2, which are constituent parts of the terminal apparatus 21-1, as well as the buffer 112, which is a constituent part of the terminal apparatus 21-1. Further, FIG. 4 shows the robot 31-1, a visual device 411, audio devices 412-1 to 412-2, and finger devices 413-*i* to 413-2, which are constituent parts of the robot control apparatus 41-1, as well as the buffer 212, which is a constituent part of the robot control apparatus 41-1.

The user 11-1 wears the head device 311 on the head, the finger device 312-1 on the fingers of his/her right hand, the finger device 312-2 on the fingers of his/her left hand, the torso device 313-1 on the right of his/her torso, and the torso device 313-2 on the left of his/her torso. The head device 311 includes a visual part 331 at a position corresponding to both eyes of the user 11-1, an audio part 332-1 at a position corresponding to the right ear of the user 11-1, and an audio part 332-2 at a position corresponding to the left ear of the user 11-1. The head device 311 is, for example, a head-mounted display. The visual part 331 processes data for each of the tight eye and the left eye.

Here, the head device 311, the finger devices 312-1 to 312-2, and the torso devices 313-1 to 313-2 have the function of the detection part 111 of the terminal apparatus 21-1. The head device 311 detects the motion of the head. The finger devices 312-1 to 312-2 detect the motion of the fingers of the right and left hands, respectively. The torso devices 313-1 to 313-2 detect the motion of the torso. The terminal apparatus 21-1 realizes a motion capture function for detecting the motion (change in posture) of the user 11-1 on the basis of the motion of each part detected by the head device 311, the finger devices 312-1 to 312-2, and the torso devices 313-1 to 313-2.

In the example of FIG. 4, the user 11-1 has the right and left torso devices 313-1 to 313-2 separately, but the user 11-1 may have one torso device instead of the right and left torso devices 313-1 to 313-2. It should be noted that FIG. 4 is an example, and any other device for detecting the state of the user may be used as the detection part 111. For example, a touch panel for detecting the content of an operation using fingers or the like of a person may be used.

The finger devices 312-1 to 312-2, the torso devices 313-1 to 313-2, the visual part 331, and the audio parts 332-1 to 332-2 have the function of the sensation imparting part 114 of the terminal apparatus 21-1. The finger devices 312-1 to 312-2 each have a function of imparting the tactile sensation to each of the fingers. The torso devices 313-1 to 313-2 have a function of imparting the tactile sensation to the torso. The visual part 331 has the function of imparting the visual sensation to both eyes (each of the left and right eyes) of the user 11-1, and displays, for example, a video image. The audio parts 332-1 to 332-2 have the function of imparting the auditory sensation to both ears (each of the left and right ears) of the user 11-1, and output sound, for example. FIG. 4 is an example, and the sensation imparting part 114 may be any device that imparts other sensations to the user.

The robot 31-1 is equipped with a visual device 411 in a position corresponding to both eyes of a person, an audio device 412-1 in a position corresponding to a right ear of a person, an audio device 412-2 in a position corresponding to a left ear of a person, a finger device 413-1 in a position corresponding to fingers of a right hand of a person, and a finger device 413-2 in a position corresponding to fingers of a left hand of a person.

Here, the visual device 411, the audio devices 412-1 to 412-2, and the finger devices 413-1 to 413-2 have the function of the detection part 214 of the robot control apparatus 41-1. The visual device 411 includes, for example, an image capturing device, and generates video data as data relating to the visual sensation. In the embodiment, the visual device 411 processes the video data for each of the right eye and the left eye. The audio devices 412-1 to 412-2 generate audio data as data relating to the auditory sensation.

The finger devices 413-1 to 413-2 generate data relating to the tactile sensation for the respective fingers. The tactile sensation data is data indicating the degree of hardness and roughness of a place touched by the finger devices 413-1 to 413-2. The detection part 214 may include a device detachable from the robot 31-1. Further, as another configuration example, the detection part 214 may include a device that is integrated and fixed to the robot 31-1. In this case, the device may be regarded as a part of the robot 31-1.

It should be noted that illustration of the communication part 113 and the control part 115 of the terminal apparatus 21-1 is omitted in the example shown in FIG. 4. Further, illustration of the communication part 211, the robot driving part 213, and the control part 215 of the robot control apparatus 41-1 is omitted in the example shown in FIG. 4. Furthermore, for convenience of description, the buffer 112 and the buffer 212 are shown as a single unit in the example shown in FIG. 4, but the configuration is not necessarily limited to this, and the buffer 112 is provided in the terminal apparatus 21-1 while the buffer 212 is provided in the robot control apparatus 41-1.

In the example shown in FIG. 4, the operator state information indicating the state of the user 11-1 detected by the detection part 111 of the terminal apparatus 21-1 is transmitted to the control part 215 or the robot driving part 213 of the robot control apparatus 41-1 by a transmission session P1, a transmission session P2, and a transmission session P3. The transmission session P1 is a session from the control part 115 or the detection part 111 of the terminal apparatus 21-1 to the buffer 112 of the terminal apparatus 21-1. The transmission session P2 is a session from the buffer 112 of the terminal apparatus 21-1 to the buffer 212 of the robot control apparatus 41-1. The transmission session P3 is a session from the buffer 212 of the robot control apparatus 41-1 to the control part 215 or the robot driving part 213 of the robot control apparatus 41-1.

The robot state information indicating the states of the robots 31-1 to 31-$n$ detected by the detection part 214 of the robot control apparatus 41-1 is transmitted to the control part 115 or the sensation imparting part 114 of the terminal apparatus 21-1 by a transmission session P11, a transmission session P12, and a transmission session P13. The transmission session P11 is a session to the buffer 212 of the robot control apparatus 41-1. The transmission session P12 is a session from the buffer 212 of the robot control apparatus 41-1 to the buffer 112 of the terminal apparatus 21-1. The transmission session P13 is a session from the buffer 112 of the terminal apparatus 21-1 to the control part 115 or the sensation imparting part 114 of the terminal apparatus 21-1.

The data transmission between the buffer 112 of the terminal apparatus 21-1 and the buffer 212 of the robot control apparatus 41-1 is performed by the communication part 113 of the terminal apparatus 21-1 and the communication part 211 of the robot control apparatus 41-1 via the network 51.

As shown in FIG. 4, in the embodiment, there are mainly two sessions serving as bi-directional data communication between the terminal apparatus 21-1 and the robot control apparatus 41-1. The first session is a session including the transmission sessions P1 to P3 from the terminal apparatus 21-1 to the robot control apparatus 41-1. In the first session, for example, the operator state information indicating the state of the user 11-1 is transmitted. The operator state information is, for example, information including data indicating the motion of the user's eyes, the motion of the user's fingers, or the motion of the user's torso.

The second session is a session including the transmission sessions P11 to P13 from the robot control apparatus 41-1 to the terminal apparatus 21-1. In the second session, the robot state information including, for example, the video data, the audio data, and the tactile data indicating the state of the robot 31-1 is transmitted.

The robot 31-1 operates in accordance with the motion of the user 11-1. The user 11-1 sees an image, hears a sound, and feels a tactile sensation at the position of the robot 31-1, and performs an operation. The robot 31-1 and the user 11-1 repeat these operations.

The robot system 1 of the embodiment compensates for the delay of bi-directional communication in the first session and the second session. For example, the control part 115 controls the amount of the robot state information temporarily stored in the buffer 112 so that the variation amount in the delay time required from the transmission of the user 11-1 state information by the transmission part 131 to the reception of the robot state information by the reception part 132 falls within a predetermined range. Here, for example, the user 11-1 and the robot 31-1 may have different delay times for their respective sessions. In such a case, the robot system 1 compensates for a different amount of the delay time for each of the first session and the second session in order to achieve synchronized motion on the side of the user 11-1 and on the side of the robot 31-1.

In this example, the total delay time of the transmission sessions P1 to P3 from the user 11-1 side (the terminal apparatus 21-1) to the robot 31-1 side (the robot control apparatus 41-1) is represented by LatM. Further, the total delay time of the transmission sessions P11 to P13 from the robot 31-1 side (the robot control apparatus 41-1) to the user 11-1 side (the terminal apparatus 21-1) is represented by LatN. In addition, the delay time of the transmission session P1 is represented by LatMu, the delay time of the transmission session P3 is represented by LatMr, the delay time of the transmission session P11 is represented by LatNr, and the delay time of the transmission session P13 is represented by LatNu.

The delay time in a mechanism (in the embodiment, the terminal apparatus 21-1) for detecting the motion of the user 11-1 is represented by LatMm, and the delay time in the mechanism (in the present embodiment, the robot control apparatus 41-1) for driving the robot 31-1 is represented by LatNm. In this case, the equations (1) and (2) are established.

[Equation 1]

$$LatM = LatMu + LatMr + LatMm \quad (1)$$

[Equation 2]

$$LatN = LatNr + LatNu + LatNm \quad (2)$$

The equation (3) is established when a total round-trip delay time (the delay time of a round-trip) including the transmission sessions P1 to P3 and the transmission sessions P11 to P13 is expressed by RTT in a case where the side of the robot 31-1 is seen from the side of the user 11-1 (for example, the side of the control part 115 of the terminal apparatus 21-1).

[Equation 3]

$$RTT = LatM + LatN \quad (3)$$

If RTT becomes large, the user 11-1 may feel dizziness and feel ill. Also, if the variation amount of RTT over time is large, the user 11-1 may feel ill.

Therefore, the robot system 1 of the embodiment is configured such that the buffer 112 is provided on the side of the user 11-1 that is on one side of the network 51, and the buffer 212 is provided on the side of the robot 31-1 that is on the other side of the network 51, so that the delay time of the data in each of the buffer 112 and the butter 212 can be adjusted. That is, the robot system can adjust the delay time on each of the side of the user 11-1 and the side of the robot 31-1.

On the side of the user 11-1, the control part 115 of the terminal apparatus 21-1 controls the delay time of the data in the buffer 112 in real time so that the equation (4) is established. On the side of the robot 31-1, the control part 215 of the robot control apparatus 41-1 controls the delay time of the data in the buffer 212 in real-time so that the equation (5) is established.

[Equation 4]

$$LatMu \sim LatNu \quad (4)$$

[Equation 5]

$$LatMr \sim LatNr \quad (5)$$

Here, in the equations (4) and (5), "~" represents the same or close. That is, the control part 115 of the terminal apparatus 21-1 controls the delay time so that the difference between the delay time LatMu of the transmission session P1 and the delay time LatNu of the transmission session P13 is equal to or less than a predetermined first time period so that the equation (4) is established. Also, the control part 215 of the robot control apparatus 41-1 controls the delay time so that the difference between the delay time LatMr of the transmission session P3 and the delay time LatNr of the transmission session P11 is equal to or less than a predetermined second time period so that the equation (5) is established. The predetermined first time period and the predetermined second time period are, for example, the maximum values of a time period that does not cause a hindrance in the operation of the robot 31-1 by the user 11-1.

Here, in this example, it is assumed that the video data transmitted from the robot control apparatus 41-1 to the terminal apparatus 21-1 requires a longer transmission time than that of the data of other media (such as the audio data and the tactile data). Regardless of the type of media, the control part 115 and the control part 215 control the delay times in the buffer 112 and the buffer 212 so that the difference in the round-trip delay time (in this example, RTT) between the side of the user 11-1 and the side of the robot 31-1 falls within the predetermined range (within the predetermined time period). The predetermined time period is determined on the basis of the video data requiring the longest transmission time, and is, for example, 40 ms. The control part 115 and the control part 215 may allow the data of media whose difference between the delay times is within the predetermined time period to pass through the buffer 112 and the buffer 212 without adding the delay time.

[Imparting a Virtual Sensation]

Even if the operability is improved by suppressing the variation of the round-trip delay time between the side of the user 11-1 and the side of the robot 31-1, the user 11-1 may feel uncomfortable if the delay time is long. In particular, if there is a long delay time from the operation of the user 11-1 until the user 11-1 visually recognizes the image captured by the robot 31-1 in the posture after being changed in accordance with the operation of the user 11-1, the user 11-1 is likely to feel dizziness. Therefore, the terminal apparatus 21 is configured to be able to impart a virtual sensation to the user 11-1. Hereinafter, an embodiment will be exemplified in which the terminal apparatus 21 causes the user 11-1 to visually recognize a virtual visual image generated by estimating an image visually recognized by the robot 31-1 as a virtual sensation. The virtual sensation is not limited to the virtual visual sensation, and may be other sensations such as a virtual auditory sensation, a virtual tactile sensation, or a virtual force sensation.

Figure 5:
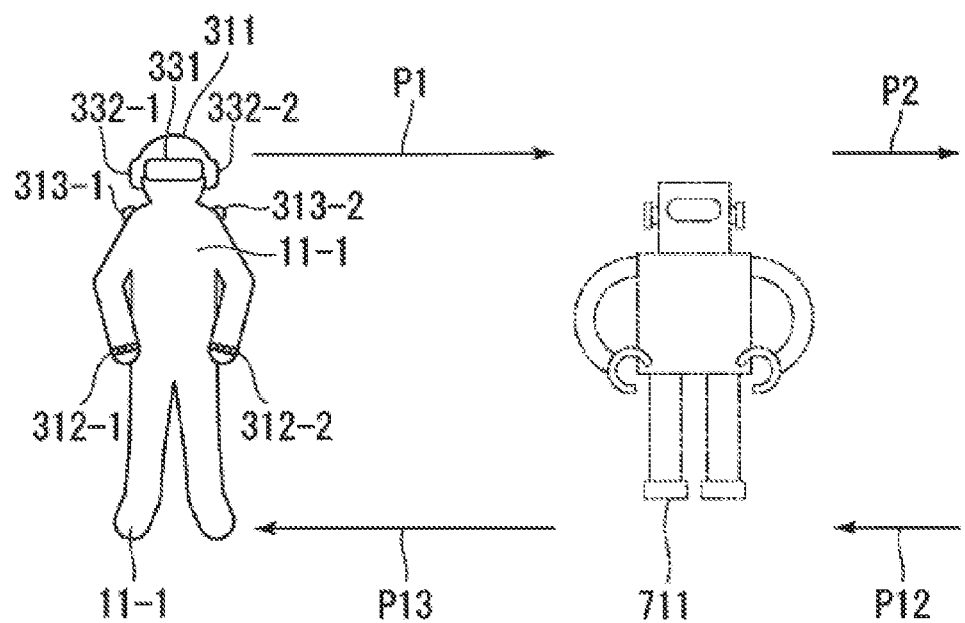
FIG. 5 is a block diagram illustrating an image of a virtual robot in the robot system according to the embodiment of the present invention.

FIG. 5 is a block diagram showing an image of a configuration for providing the virtual sensation in the robot system 1 according to the embodiment of the present invention. FIG. 5 shows the user 11-1 wearing the head device 311 or the like, and a virtual robot 711. The virtual robot 711 is a robot capable of providing the virtual sensation using data stored in the buffer 112 of the terminal apparatus 21-1, and includes a computer that virtually reproduces the state of the robot 31-1. In this example, the control part 115 of the terminal apparatus 21-1 operates as if it is transmitting/receiving data to/from the virtual robot 711.

If the delay time (for example, RTT) required from the transmission of the operator state information by the transmission part 131 to the reception of the robot state information by the reception part 132 is equal to or less than the predetermined time period, the control part 115 controls the sensation imparting part 114 to impart the sensation based on the robot state information to the user 11-1 as an operator. On the other hand, if the delay time is longer than the predetermined time period, the control part 115 controls the sensation imparting part 114 to impart the sensation based on virtual state information indicating the estimated state of the robot 31-1 to the user 11-1. The virtual state information includes data indicating visual, auditory, tactile, and force sensations, in the same manner as the robot state information.

Figure 6A:
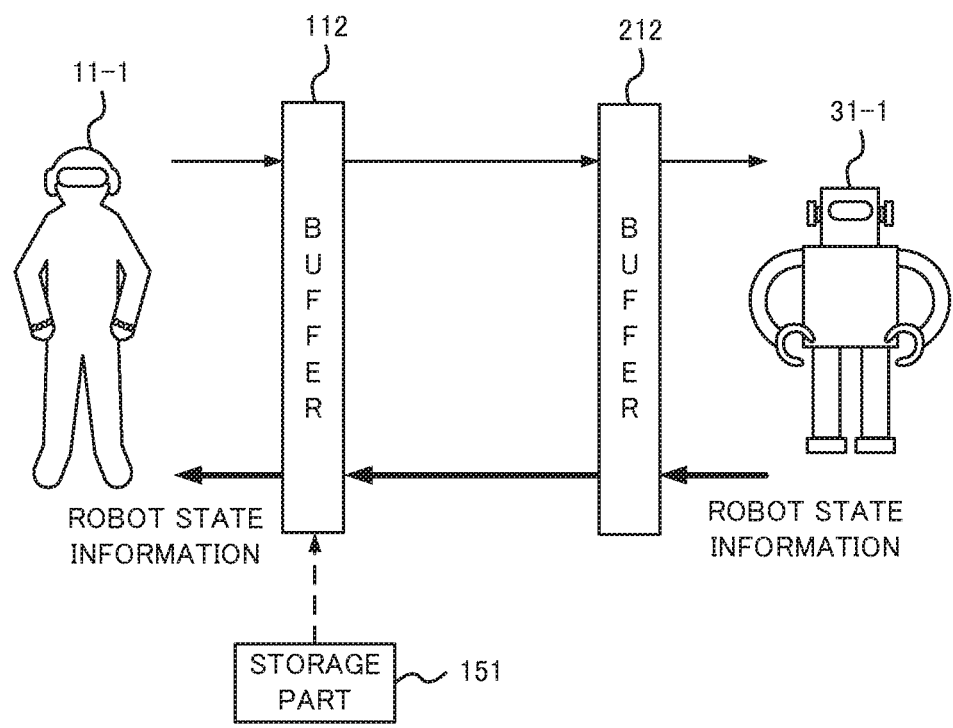
FIG. 6A is a diagram for explaining the operation of the robot system if the delay time is equal to or less than the predetermined time period.
Figure 6B:
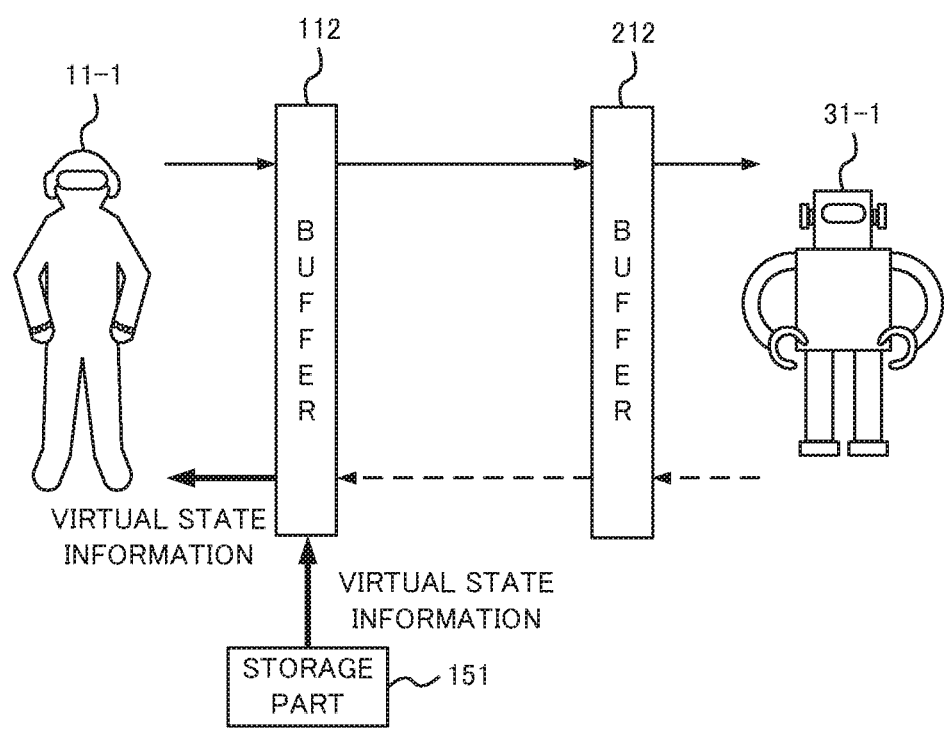
FIG. 6B is a diagram for explaining the operation of the robot system if the delay time is longer than the predetermined time period.

FIG. 6A is a diagram for explaining the operation of the robot system 1 if the delay time is equal to or less than the predetermined time period. FIG. 6B is a diagram for explaining the operation of the robot system 1 if the delay time is longer than the predetermined time period. As shown in FIG. 6A, if the delay time is small enough not to cause trouble in the operation of the user 11-1, the robot state information is imparted to the user 11-1 via the buffer 112 of the terminal apparatus 21-1. On the other hand, as shown in FIG. 6B, if the delay time is long enough to cause trouble in the operation of the user 11-1, for example, the virtual state information stored in the storage part 151 is imparted to the user 11-1 from the terminal apparatus 21-1. Hereinafter, the details of the operation of the terminal apparatus 21-1 for providing the virtual state information will be described.

The control part 115 controls the sensation imparting part 114 so as to impart, to the user 11-1, at least some pieces of the virtual state information among a plurality of pieces of the virtual state information corresponding to virtual robots in different states, which are stored in the storage part 151, for example. Specifically, the control part 115 controls the sensation imparting part 114 to impart, to the user 11-1, the sensation based on the virtual state information selected from a plurality of pieces of the virtual state information on the basis of the operator state information.

More specifically, the storage part 151 stores the plurality of pieces of the virtual state information including virtual images corresponding to images captured by the robots 31-1 in different states. The virtual image is a captured image generated by the visual device 411 already included in the robot 31-1 or an image capturing device mounted on another equivalent robot, and the image is associated with information indicating the state of the robot (for example, the position of each part of the robot) at the time of capturing the image. The control part 115 controls the sensation imparting part 114 so as to impart, to the operator, the sensation based on the virtual state information, among the plurality of pieces of the virtual state information, including the virtual images corresponding to the position of the robot 31-1 specified on the basis of operation content indicated by the operator state information.

In order to select one piece of the virtual state information from the plurality of pieces of the virtual state information, the control part 115 estimates the state of the robot 31-1 after the operation of the user 11-1 on the basis of the state of the user 11-1 indicated by the immediately preceding operator state information and the state of the user 11-1 indicated by the most recent operator state information. The control part 115 selects one piece of the virtual state information corresponding to the estimated state of the robot 31-1. In this manner, even if the robot state information transmitted from the robot control apparatus 41-1 is delayed, the control part 115 can impart the sensation based on the virtual state information to the operator before the reception part 132 receives the robot state information. This allows the user 11-1 to easily operate the robot 31-1.

The control part 115 may extract an image of the robot 31-1 included in an image as the robot state information that was provided to the user 11-1 immediately before, and may provide the user 11-1 with an image obtained by replacing the extracted image with an image of the robot indicated by the virtual state information. In this manner, the control part 115 can provide the user 11-1 with an image including an image of a virtual robot attempting to grasp an object when, for example, the robot 31-1 is operating to grasp the object.

The control part 115 may store sensation history information indicating content of the sensation based on the robot state information imparted by the sensation imparting part 114 in the storage part 151. In this instance, the control part 115 selects the virtual state information, from the plurality of pieces of the virtual state information, to be used for imparting the sensation to the operator on the basis of the content of the sensation indicated by the sensation history information stored in the storage part 151 immediately before. For example, the control part 115 selects the virtual state information in which the variation amount from the sensation indicated by the sensation history information stored immediately before falls within the predetermined range. By doing so, since the sensation imparted to the user 11-1 does not change abruptly, the terminal apparatus 211 can prevent the user 11-1 from feeling discomfort.

After imparting the sensation based on the virtual state information to the user 11-1, the control part 115 controls the sensation imparting part 114 to impart the sensation based on the robot state information received by the reception part 132 to the user 11-1. Specifically, for example, if it is determined that the motion of the robot 31-1 within the delay time required from the transmission of the operator state information by the transmission part 131 to the reception of the robot state information by the reception part 132 is smaller than an amount perceivable by the user 11-1, the control part 115 imparts the sensation based on the actual state of the robot 31-1 to the user 11-1. More specifically, the control part 115 stops the impartation of a first sensation based on the virtual state information and switches to the impartation of a second sensation based on the robot state information when it is determined that the variation amount of the robot state information within the delay time is less than a threshold value. In such a way, the user 11-1 can grasp the actual state of the robot 31-1 at the point in time when the motion of the robot 31-1 stops.

Here, the state indicated by the virtual state information does not necessarily coincide completely with the actual state of the robot 31-1. Therefore, after the impartation of the first sensation based on the virtual state information is stopped and the impartation of the second sensation based on the robot state information is started, the user 11-1 may have a sense of discomfort because the difference between the first sensation and the second sensation is large. To solve this problem, when there is a difference of a predetermined magnitude or more between the first sensation based on the virtual state information and the second sensation based on the robot state information received by the reception part 132 after the sensation based on the virtual state information is imparted to the user 11-1, the control part 115 may control the sensation imparting part 114 so as to impart a sensation interpolated between the first sensation and the second sensation to the user 11-1.

The control part 115, for example, generates the plurality of pieces of the virtual state information for interpolating between the first sensation and the second sensation and controls the sensation imparting part 114 so that the user gradually reaches the second sensation from the first sensation. In a case where the first sensation and the second sensation are visual sensations, the control part 115 provides a plurality of virtual images to the user 11-1 so that the fingertip of the robot 31-1 at the position corresponding to the first sensation included in the image provided to the user 11-1 appears to move gradually to the position corresponding to the second sensation. This allows the control part 115 to prevent the user 11-1 from feeling discomfort due to a sudden change in the imparted sensation.

The control part 115 may control the sensation imparting part 114 to impart the sensation based on the robot state information to the user 11-1 if the amount of the one or more pieces of the robot state information stored in the buffer 112 is equal to or greater than the threshold value, and to impart the sensation based on the virtual state information to the user 11-1 if the amount of the one or more pieces of the robot state information stored in the buffer 112 becomes less than the threshold value. By doing so, even if a transmission delay of the robot state information occurs in a state where the amount of the robot state information temporarily stored in the buffer 112 is reduced, it is possible to impart the sensation based on the virtual state information to the user 11-1. Accordingly, the delay time required from the transmission of the operator state information by the transmission part 131 to the reception of the robot state information by the reception part 132 can be reduced, and the user 11-1 can easily control the robot 31-1.

The control part 115 may specify a factor of the delay from the transmission of the user 11-1 state information by the transmission part 131 to the reception of the robot state information by the reception part 132. On the basis of the specified factor, the control part 115 determines whether to control the sensation imparting part 114 to impart the sensation based on the virtual state information stored in the storage part 151 to the user 11-1, or to control the sensation imparting part 114 to impart the sensation based on the virtual state information received via the network 51 to the user 11-1. The virtual state information received via the network 51 is, for example, the virtual state information provided from the robot control apparatus 41-1 or a server on a cloud that monitors the state of the robot 31-1 and generates the virtual state information on the basis of the state of the robot 31-1.

If a throughput or storage capacity of the robot control apparatus 41-1 or the server on the cloud is better than that of the terminal 21-1, it is considered that the robot control apparatus 41-1 or the server on the cloud can generate the virtual state information with higher accuracy (that is, closer to the actual state of the robot 31-1) than the virtual state information stored in the storage part 151. Therefore, the control part 115 can impart a sensation close to the actual state of the robot 31-1 to the user 11-1 by using the virtual state information provided from the robot control apparatus 41-1 or the server on the cloud when the delay time in the network 51 is equal to or less than the threshold value.

It should be noted that the control part 115 of the terminal apparatus 21-1 and the control part 215 of the robot control apparatus 41-1 communicate information about a processing delay time on their own side with each other via the network 51. The processing delay time is (i) a time from when the user 11-1 operates to when the terminal apparatus 21-1 transmits the operator state information, and (ii) a time from when the robot 31-1 changes the state to when the robot control apparatus 41-1 transmits the robot state information. The control part 115 and the control part 215 specify a value of the round-trip delay time RTT between the side of the user 11-1 and the side of the robot 31-1 on the basis of the acquired delay time of the other side. The control part 115 determines whether to impart the sensation based on the virtual state information to the user 11-1 or to impart the sensation based on the robot state information to the user 11-1 on the basis of the specified delay time value.

The robot system I may control the robot 31-1 on the basis of virtual operator state information generated by estimating the state of the user 11-1. For example, if the delay time from when the transmission part 131 of the terminal apparatus 21-1 transmits the operator state information to when the operator state information reaches the reception part 231 of the robot control apparatus 41-1 is equal to or longer than a predetermined threshold value, the control part 215 of the robot control apparatus 41-1 controls the robot 31-1 on the basis of the virtual operator state information. The virtual operator state information is, for example, information generated by estimating the most recent state of the operator on the basis of one or more pieces of the immediately preceding operator state information. This makes it possible to accelerate the response of the robot 31-1 to the operation performed by the user 11-1, thereby further improving the operability.

The virtual operator state information used by the control part 215 may be virtual operator state information selected from a plurality of pieces of the virtual operator state information stored in the storage part 251, or may be virtual operator state information generated on the basis of a model of the user 11-1 generated by computer graphics (CG).

[Synchronizing Multi-Stream Data in the Network]

In the embodiment, the second session from the robot control apparatus 41-1 to the terminal apparatus 21-1 includes the video data, audio data, and tactile data. Depending on the processing speed of the data of respective media, the delay times of the data of respective media may be different. Among these media, the delay time of the video data is the largest. Therefore, in the embodiment, the control part 115 of the terminal apparatus 21-1 and the control part 215 of the robot control apparatus 41-1 use time information assigned to respective image frames included in the video data as a reference value of the delay time.

In one example, the control part 215 of the robot control apparatus 41-1 includes the audio data and the tactile data in each of the image frames that transmit the video data. This makes it possible to associate the time information with the audio data and the tactile data to which the time information is not assigned.

Alternatively, the control part 215 of the robot control apparatus 41-1 may synchronize the video data, the audio data, and the tactile data using time stamps. In this instance, the control part 215 of the robot control apparatus 41-1 assigns a time stamp indicating the time to the data or the communication frame of the respective media. The control part 115 of the terminal apparatus 21-1 and the control part 215 of the robot control apparatus 41-1 may use a clock signal supplied from a shared clock source as a clock used for referencing the time stamp. As the shared clock source, for example, a source provided by a third party may be used, or a source provided by any device included in the robot system 1 (for example, a server that is a management apparatus connected to the network 51) may be used.

Figure 7:
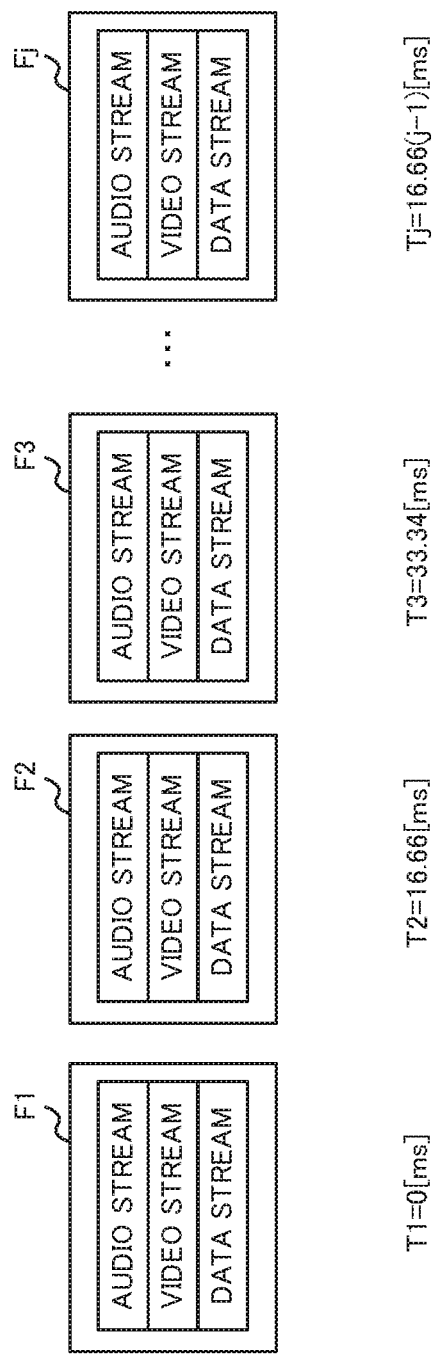
FIG. 7 is a block diagram illustrating a schematic configuration of communication frames according to the embodiment of the present invention.

FIG. 7 is a block diagram illustrating a schematic configuration of communication frames F1 to Fj (j is an integer of 2 or more) according to the embodiment of the present invention. FIG. 7 shows a plurality (j pieces) of the consecutive communication frames F1 to Fj transmitted from the robot control apparatus 41-1.

In the embodiment, it is assumed that the communication speed of the communication frames F1 to Fj is 60 [fps (frames/second)]. Assuming that the transmission time T1 of the communication frame F1 is 0 [ms], the transmission time Tj of the communication frame Fj is approximately $\{16.6666*(j-1)\}$[ms]. Each of the communication frames F1 to Fj includes the video data, imaged audio data, and imaged tactile data. The video data includes, for example, the left-eye video data and the tight-eve video data. The audio data includes, for example, the audio data of the left ear and the audio data of the right ear. The tactile data includes, for example, the fingertip data.

Each of the communication frames F1 to Fj includes information of consecutive serial numbers (frame numbers) in the order of transmission. The terminal apparatus 21-1 and the robot control apparatus 41-1 can specify the timings of the respective communication frames F1 to Fj on the basis of such serial numbers (frame numbers). It should be noted that communication packets may be used instead of the communication frames.

Even if some the communication frames F1 to Fj are lost in the second session from the robot control apparatus 41-1 to the terminal apparatus 21-1, the control part 115 and the control part 215 can discard data or perform retransmission control in units of the communication frames including the data of all media (video, audio, and tactile) in response to the elapse of a time-out period. The control part 115 and the control part 215 may retransmit the corresponding data if the delay time is equal to or less than the predetermined threshold value, and may discard the corresponding data if the delay time is greater than the predetermined threshold value.

[Motion Buffering]

The data transmitted and received between the terminal apparatus 21-1 and the robot control apparatus 41-1 may be lost during data transmission. In such cases, the control part 115 of the terminal apparatus 21-1 may interpolate the lost data using the data stored in the buffer 112 so that the robot 31-1 operates as intended by the user 11-1 and the operability of the user 11-1 improves. Thus, for example, even if some data is lost, the control part 115 of the terminal apparatus 21-1 can estimate and reproduce the lost data on the basis of other data that has not been lost.

Similarly, the control part 215 of the robot control apparatus 41-1 can compensate for any intermediate data by interpolating the data using the data stored in the buffer 212. As a result, the control part 215 of the robot control apparatus 41-1 can estimate and reproduce the lost data on the basis of other data that has not been lost even if some data has been lost, for example. Such an interpolation may be applied, for example, to any one or both of the data of the first session and the data of the second session.

[Summary of the Configuration and Operation of the Robot System 1]

As described above, the robot system 1 according to the embodiment can realize high-quality robot control by compensating for the delay by using the buffer 112 and the buffer 212 in telexistence. For example, the robot system 1 temporarily stores the operator state information and the robot state information in the buffer 112 and the buffer 212, so that the variation amount of the delay time required from when the transmission part 131 transmits the operator state information to when the reception part 132 receives the robot state information can be suppressed within the predetermined range. This makes it easier for the user 11.-1 using the robot system 1 to operate the robot 31-1.

If the delay time required from when the transmission part 131 transmits the operator state information to when the reception part 132 receives the robot state information is longer than the predetermined time period, the robot system 1 imparts the sensation based on the virtual state information to the user 11-1. With such a configuration of the robot system 1, even if the delay time of data transmission in the network 51 is long, it is possible to shorten the time from the operation by the user 11-1 to the acquisition of the sensation corresponding to the state of the robot 31-1. As a result, the user 11-1 can comfortably control the robot 31-1.

It should be noted that the robot system 1 may control the delay time in each of the buffer 112 on the user 11-1 side and the buffer 212 on the robot 31-1 side in another manner. As an example, the robot system 1 may be controlled to hold bi-directional data (data of the first session and data of the second session) for a predetermined period of time in each of the buffer 112 on the user 11-1 side and the buffer 212 on the robot 31-1 side, and output the data every predetermined period of time. The predetermined period of time is determined in accordance with, for example, the medium having the longest delay time, and in this example, the predetermined period of time is determined in accordance with the delay time of the video data transmitted from the robot control apparatus 41-1 to the terminal apparatus 21-1.

Here, the number of users 11-1 to 11-$n$, the number of terminal apparatuses 21-1 to 21-$n$, the number of robot control apparatuses 41-1 to 41-$n$, and the number of robots 31-1 to 31-$n$ may be any number. For example, the number of users 11-1 to 11-$n$ and the number of robots 31-1 to 31-$n$ may be the same or different.

In addition, in the embodiment, a configuration is shown in which the terminal apparatus 21-1 is provided with the buffer 112 and the control part 115 for controlling the delay time in the buffer 112 on the user 11-1 side, but as another configuration, one or both of the buffer 112 and the delay time control function in the buffer 112 may be provided in a control apparatus different from the robot control apparatus 41-1.

Similarly, in the embodiment, a configuration is shown in which the robot control apparatus 41-1 is provided with the buffer 212 and the control part 215 for controlling the delay time in the buffer 212 on the robot 31-1 side, but the present invention is not limited to such a configuration. As another configuration, one or both of the buffer 212 and the delay time control function in the buffer 212 may be provided in a control apparatus different from the robot control apparatus 41-1.

Here, in the robot system 1, one or more pieces of data of the visual, auditory, and tactile sensations and the like may be detected and transmitted to the side of the robot 31-1 by the terminal apparatus 21-1 on the side of the user 11-1, and the robot control apparatus 41-1 may receive the data on the side of the robot 31-1 to reproduce the sensation (such as, the visual, auditory, or tactile sensation) based on the data. In this case, the terminal apparatus 21-1 includes, for example, a sensor (for example, an image capturing device (a camera)) for detecting a video image, a sensor (for example, a microphone) for detecting sound, a sensor (for example, a pressure sensor) for detecting the tactile sensation, or the like as the detection part 111.

Further, the robot control apparatus 41-1 includes, for example, a sensation reproduction part that reproduces a sensation based on data such as the video, audio, and tactile data received from the terminal apparatus 21-1. The function of the sensation reproduction part may be provided in, for example, the robot driving part 213, or may be provided separately from the robot driving part 213. A part or all of the function of the sensation reproduction part may be mounted on the robot 31-1. The sensation reproduction part in this case is, for example, a video display device for reproducing a video image, a speaker for reproducing sound, a pressure generator (a motion generator) for reproducing the tactile sensation, or the like.

[Modification 1]

In the robot system 1, a plurality of users may control one shared robot. A case where three users 11-1 to 11-3 control one robot 31-1 is shown as an example. In this example, the terminal apparatuses 21-1 to 21-3 of the three users 11-1 to 11-3 communicate with the robot control apparatus 41-1 in a time-sharing manner to control the robot 31-1. For example, the robot 31-1 includes a plurality of movable parts, and the three users 11-1 to 11-3 respectively control different movable parts. The plurality of movable parts is, for example, a plurality of arms.

Figure 8:
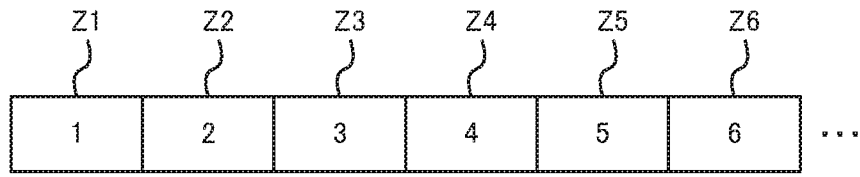
FIG. 8 is a block diagram illustrating a schematic configuration of a time-sharing communication frame according to the embodiment of the present invention.

FIG. 8 is a block diagram illustrating a schematic configuration of time-sharing communication frames Z1 to Z6 according to the embodiment of the present invention. FIG. 8 shows a plurality of the consecutive communication frames Z1 to Z6. In this example, the terminal apparatus 21-$i$ of the first user 11-1 communicates with the robot control apparatus 41-1 using the first communication frame Z1, for example. The terminal apparatus 21-2 of the second user 11-2 communicates with the robot control apparatus 41-1 using the second communication frame Z2. The terminal apparatus 21-3 of the third user 11-3 communicates with the robot control apparatus 41-1 using the third communication frame Z3. In this manner, the plurality of terminal apparatuses 21-1 to 21-3 communicate with the shared robot control apparatus 41-1 in a time-sharing manner, thereby controlling the shared robot 31-1.

[Modification 2]

In the robot system 1, one user may control a plurality of robots. A case where the one user 11-1 controls three robots 31-1 to 31-3 is shown as an example. In this embodiment, the terminal apparatus 21-1 of the one user 11-1 controls the three robots 31-1 to 31-3 by communicating with three robot control apparatuses 41-1 to 41-3 in a time-sharing manner.

The description will be made using the example of FIG. 8. In this example, the terminal apparatus 21-1 of the one user 11-1 communicates with the robot control apparatus 41-1 of the first robot 311 using the first communication frame Z1. The terminal apparatus 21-1 communicates with the robot control apparatus 41-2 of the second robot 31-2 using the second communication frame Z2 The terminal apparatus 21-1 communicates with the robot control apparatus 41-3 of the third robot 31-3 using the third communication frame Z3. In this manner, the one terminal apparatus 21-1 communicates with the plurality of robot control apparatuses 41-1 to 41-3 in a time-sharing manner, thereby controlling the plurality of robots 31-1 to 31-3.

[Modification 3]

The robot system 1 may further include a management apparatus connected to the terminal apparatuses 21-1 to 21-$n$ and the robot control apparatuses 41-1 to 41-$n$ via the network 51. The management apparatus is, for example, a server.

A management apparatus 61 is connected to the network 51, and relays the communication between the terminal apparatuses 21-1 to 21-$n$ and the robot control apparatuses 41-1 to 41-$n$. That is, the management apparatus 61 receives a signal transmitted from the terminal apparatuses 21-1 to 21-$n$ to the network 51 and transmits the signal to the robot control apparatus 41-1 to 41-$n$ of the destination, and further, the management apparatus 61 receives a signal transmitted from the robot control apparatus 41-1 to 41-$n$ to the network 51 and transmits the signals to the terminal apparatuses 21-1 to 21-$n$ of the destination.

As described above, the robot system may include the management apparatus 61 on the cloud to manage the communication performed between the terminal apparatuses 21-1 to 21-$n$ and the robot control apparatuses 41-1 to 41-$n$. For example, the management apparatus 61 stores information of each address of the terminal apparatuses 21-1 to 21-$n$ and the robot control apparatuses 41-1 to 41-$n$ corresponding to each other, and relays the signals communicated between them on the basis of the information of the addresses. The management apparatus 61 may have a machine learning function, and may correct, on the basis of a result of the machine learning, an operation in which the users 11-1 to 11-$n$ control the robots 31-1 to 31-$n$.

In the embodiment described while referencing FIGS. 2 to 6, the terminal apparatus 21-1 includes the buffer 112 and the function of adjusting the delay time of the data in the buffer 112. Further, the robot control apparatus 41-1 includes the buffer 212 and the function of adjusting the delay time of the data in the buffer 212. Any one or both of these two functions may be provided in the management apparatus 61.

As an example, the management apparatus 61 may include the buffer 112 and the function of adjusting the delay time of data in the buffer 112 (referred to as a function C1 in this example for convenience of description) instead of the terminal apparatus 21-1. In this case, the terminal apparatus 21-1 does not need to have such a function C1.

As another example, the management apparatus 61 may include the buffer 212 and the function of adjusting the delay time of the data in the buffer 212 (referred to as a function C2 in this example for convenience of description) instead of the robot control apparatus 41-1. In this case, the robot control apparatus 41-1 does not need to have such a function C2.

Further, as another example, the management apparatus 61 may include both the function C1 and the function C2. In particular, if the communication delay is small, it is considered preferable that the management apparatus 61 has the function C1 or the function C2. For example, if the delay of the data communication from the terminal apparatus 21-1 to the robot control apparatus 41-1 via the network 51 is smaller than the delay of the data communication from the robot control apparatus 41-1 to the terminal apparatus 21-1 via the network 51, the configuration in which the terminal apparatus 21-$i$ includes the function C1 and the management apparatus 61 includes the function C2 may be used.

Figure 9:
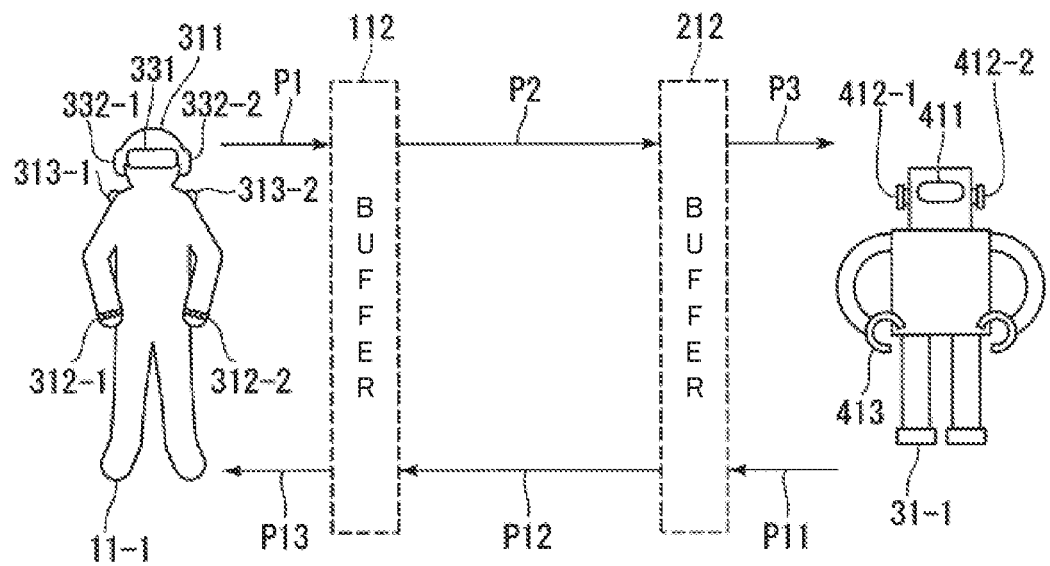
FIG. 9 is a diagram illustrating a management apparatus capable of communicating with a terminal apparatus and a robot control apparatus via a network.
Figure 9:
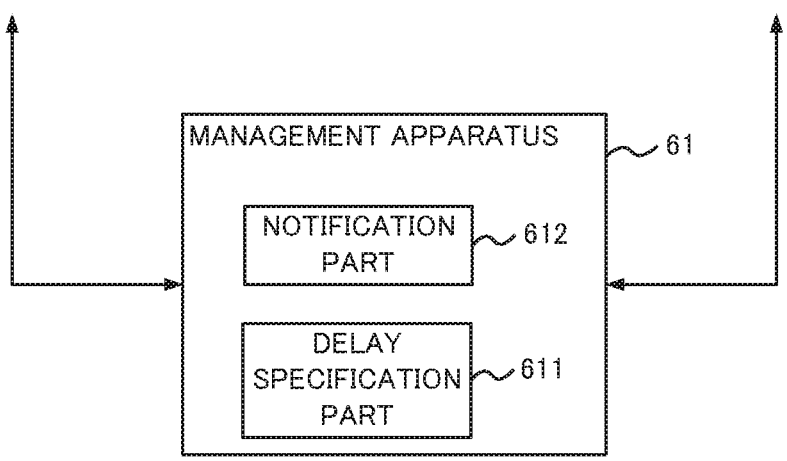

FIG. 9 is a diagram illustrating the management apparatus 61 capable of communicating with the terminal apparatus 21-1 and the robot control apparatus 41-1 via the network 51. The management apparatus 61 includes a delay specification part 611 and a notification part 612. The delay specification part 611 specifies the delay time from when the terminal apparatus 21-1 transmits the operator state information to when the terminal apparatus 21-1 receives the robot state information, on the basis of the time at which the operator state information is received from the terminal apparatus 21-1 and the time at which the robot state information is received from the robot control apparatus 41-$i$. The notification part 612 notifies the control part 115 of the terminal apparatus 21-1 about the delay time specified by the delay specification part 611.

The control part 115 may decide to impart the sensation based on the virtual state information to the user 11-1 on the basis of an instruction from the management apparatus. In this case, the delay specification part 611 of the management apparatus specifies the factor causing the delay, and the notification part 612 instructs the control part 115 of the terminal apparatus 21-1 to impart the sensation based on the virtual state information to the user 11-1 if the factor specified by the delay specification part 611 is the transmission delay of the network 51. On the basis of the instruction from the notification part 612, the control part 115 controls the sensation imparting part 114 to impart the sensation based on the virtual state information to the user 11-1. In this manner, the control part 115 imparts the sensation based on the virtual state information on the basis of the instruction from the management apparatus, and therefore the control part 115 can impart the sensation based on whichever information, either the virtual state information or the robot state information, is more suitable for the delay state of the networks 51.

Figure 10:
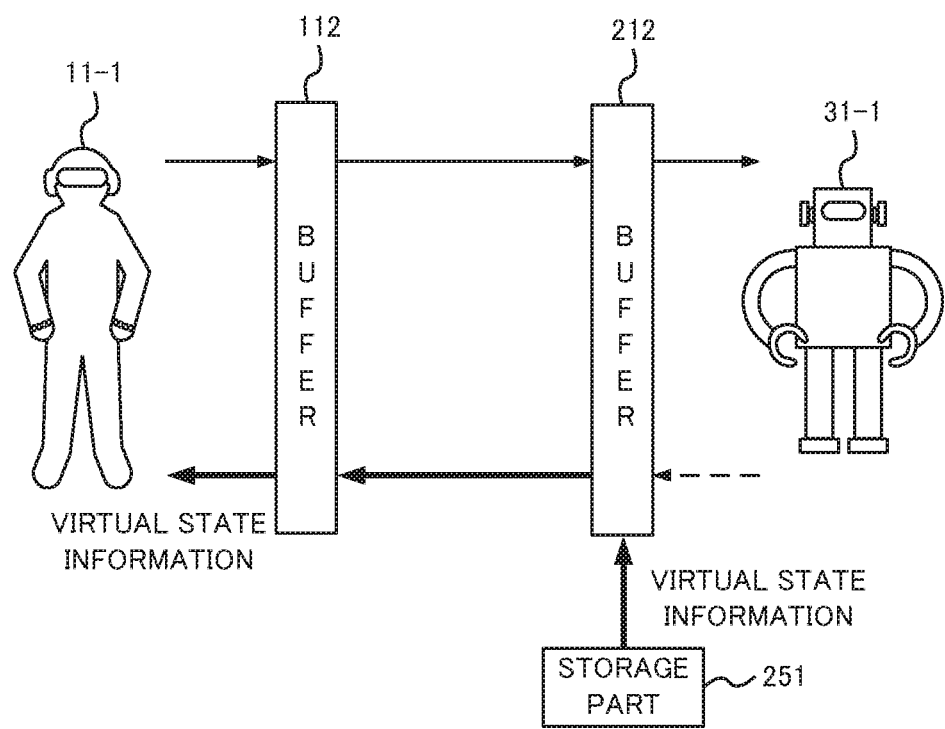
FIG. 10 is a diagram illustrating the robot system in which the robot control apparatus provides the virtual state information to the user.

The notification part 612 may instruct the robot control apparatus 41-1 to transmit the virtual state information to the terminal apparatus 21-1 if the factor specified by the delay specification part 611 is the operation delay of the robot. FIG. 10 is a diagram illustrating the robot system 1 in which the robot control apparatus 41-1 provides the virtual state information to the user 11-1. The robot control apparatus 41-1 provides the terminal apparatus 21-1 with, for example, the virtual state information selected from the plurality of pieces of the virtual state information stored in the storage part 251. With such a configuration of the robot system 1, even if the terminal apparatus 21-1 does not store the virtual state information, the terminal apparatus 21-1 can impart the sensation based on the virtual state information to the user 11-1.

SUMMARY OF THE EMBODIMENT

In the robot system 1, the terminal apparatus (in the example of FIG. 1, the terminal apparatuses 21-1 to 21-n) transmits the data relating to the user (in the example of FIG. 1, the users 11-1 to 11-n) to the robot control apparatus (in the example of FIG. 1, the robot control apparatuses 41-1 to 41-n) via the network (in the example of FIG. 1, the network 51). The robot control apparatus controls the robot (in FIG. 1, robots 31-1 to 31-n) on the basis of the data.

In addition, the robot control apparatus transmits the data relating to the robot to the terminal apparatus via the network, and the terminal apparatus imparts the sensation to the user on the basis of the data. At least one of the terminal apparatus and the robot control apparatus includes (i) the buffer (the buffers 112 and 212 in the examples of FIGS. 2 and 3) for storing at least one piece of data from among the data to be transmitted and the data received, and (ii) the control part (the control parts 115 and 215 in the examples of FIGS. 2 and 3) for controlling the delay time of the data stored in the buffer. Since the robot system 1 has such a configuration, the robot system 1 can adjust the transmission delay of data so as not to cause trouble in the operation of the robot by the user thereby improving the operability of the robot in telexistence.

In one configuration, when transmitting the data to be transmitted and the received data, the control part controls the delay time of a predetermined transmission between the network and the user or between the network and the robot to be within the predetermined range.

In one configuration, the data related to the user includes the data related to the motion of the user, the data related to the robot includes the video data, the audio data, and the tactile data in the robot, and the robot control apparatus communicates the video data, the audio data, and the tactile data in a shared communication frame. In one configuration, the data is interpolated using the data stored in the buffer for at least one of the terminal apparatus and the robot control apparatus.

In one configuration, the terminal apparatus imparts the sensation based on the robot state information to the user if the delay time required from transmitting the operator state information to receiving the robot state information is equal to or less than the predetermined time period, and imparts the sensation based on the virtual state information indicating the estimated state of the robot to the user if the delay time is longer than the predetermined time period. Because the terminal apparatus works in this manner, even if the delay time is long, the user can quickly feel the sensation corresponding to the state of the robot, thereby improving the operability.

A program for realizing the functions of the respective apparatuses (for example, the terminal apparatuses 21-1 to 21-n or the robot control apparatus 41-1 to 41-n) according to the embodiment described above may be recorded in a computer-readable recording medium (a storage medium), and the program recorded in the recording medium may be read into a computer system and executed to perform the process.

The "computer system" herein may include an operating system (OS) or hardware such as a peripheral device. The "computer-readable recording medium" refers to a writable non-volatile memory such as a flexible disk, a magneto-optical disk, a ROM, a flash memory, a portable medium such as a digital versatile disc (DVD), or a storage device such as a hard disk incorporated in a computer system. It should be noted that the recording medium may be, for example, a recording medium detachable from a computer. Further, the recording medium may be, for example, a recording medium that temporarily records data.

Furthermore, the "computer-readable recording medium" includes a medium that holds a program for a predetermined period of time, such as a volatile memory (for example, a dynamic random access memory (DRAM)) in a computer system serving as a server or a client when the program is transmitted via a network such as the Internet or a communication line such as a telephone line.

The program may be transmitted from a computer system storing the program in a storage device or the like to another computer system via a transmission medium or by a transmission wave in the transmission medium. Here, the "transmission medium" for transmitting a program refers to a medium having a function of transmitting information, for example, a network (communication network) such as the Internet or a telecommunication line (communication line) such as a telephone line.

Further, the above-mentioned program may be a program for realizing a part of the above-mentioned functions. Furthermore, the above-mentioned program may be a so-called difference file (difference program) capable of realizing the above-mentioned functions in combination with a program already recorded in the computer system.

The embodiment of the present invention is explained above in detail while referencing the drawings. The specific configuration is not limited to above embodiment and it is possible to make various modifications within the scope of the invention.

The present invention has been described above on the basis of the exemplary embodiments. The technical scope of the present invention is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. A sensation imparting apparatus comprising:
a transmission part that transmits operator state information indicating a state of an operator operating a robot to the robot;
a reception part that receives robot state information indicating a state of the robot from the robot;
a sensation imparting part that imparts a predetermined sensation to the operator; and
a control part that controls the sensation imparting part to impart a sensation based on the robot state information to the operator if a delay time required from when the transmission part transmits the operator state information to when the reception part receives the robot state information is equal to or shorter than a predetermined time period, and controls the sensation imparting part to impart a sensation based on virtual state information indicating an estimated state of the robot to the operator if the delay time is longer than the predetermined time period, wherein the control part controls the sensation imparting part to impart, to the operator, a sensation interpolated between a first sensation based on the virtual state information and a second sensation based on the robot state information received by the reception part after imparting the sensation based on the virtual state information to the operator, if there is a difference of a predetermined magnitude or more between the first sensation and the second sensation.

2. The sensation imparting apparatus according to claim 1, wherein the control part controls the sensation imparting part to impart the sensation based on the robot state information received by the reception part to the operator after imparting the sensation based on the virtual state information to the operator.

3. The sensation imparting apparatus according to claim 1, further comprising:

a buffer part that temporarily stores one or more pieces of the robot state information received by the reception part and then sequentially outputs the one or more pieces of the robot state information to the sensation imparting part, wherein the control part controls the sensation imparting part to impart a sensation based on virtual state information to the operator if an amount of the one or more pieces of the robot state information stored in the buffer part becomes less than a threshold value.

4. The sensation imparting apparatus according to claim 1, further comprising:

a buffer part that temporarily stores one or more pieces of the robot state information received by the reception part and then sequentially outputs the one or more pieces of the robot state information to the sensation imparting part, wherein the control part controls an amount of the robot state information temporarily stored in the buffer part so that a variation amount of a delay time required from when the transmission part transmits the operator state information to when the reception part receives the robot state information falls within a predetermined range.

5. The sensation imparting apparatus according to claim 1, wherein the control part includes a storage part that stores a plurality of pieces of the virtual state information corresponding to the robots in different states, and controls the sensation imparting part to impart a sensation based on virtual state information selected from the plurality of pieces of the virtual state information to the operator on the basis of the operator state information.

6. The sensation imparting apparatus according to claim 5, wherein the storage part stores the plurality of pieces of the virtual state information including virtual images corresponding to images captured by the robots in different states, and the control part controls the sensation imparting part to impart, to the operator, a sensation based on virtual state information including the virtual image corresponding to a position of the robot specified on the basis of an operation content indicated by the operator state information among the plurality of pieces of the virtual state information.

7. The sensation imparting apparatus according to claim 6, wherein the control part specifies a factor causing a delay from when the transmission part transmits the operator state information to when the reception part receives the robot state information, and determines, on the basis of the specified factor, whether to control the sensation imparting part to impart the sensation based on the virtual state information stored in the storage part to the operator or to control the sensation imparting part to impart the sensation based on the virtual state information received via a network to the operator.

8. The sensation imparting apparatus according to claim 5, wherein the control part estimates a state of the robot after the operator operates, on the basis of the state of the operator indicated by the immediately preceding operator state information and the state of the operator indicated by the most recent operator state information, in order to select one piece of virtual state information from the plurality of pieces of the virtual state information, and selects one piece of virtual state information corresponding to the estimated state of the robot.

9. The sensation imparting apparatus according to claim 5, wherein the control part stores sensation history information indicating content of the sensation based on the robot state information imparted by the sensation imparting part in the storage part, and selects virtual state information to be used for imparting a sensation to the operator from the plurality of pieces of the virtual state information on the basis of the content of the sensation indicated by the sensation history information stored immediately before.

10. A robot control system comprising:

a sensation imparting apparatus that transmits, to a network, operator state information indicating a state of an operator operating a robot;

a robot control apparatus that controls the robot on the basis of the operator state information received via the network; and a management apparatus that is capable of communicating with the robot control apparatus and the sensation imparting apparatus via the network, wherein the sensation imparting apparatus includes:

a transmission part that transmits the operator state information indicating the state of the operator operating the robot to the robot;

a reception part that receives robot state information indicating a state of the robot from the robot;

a sensation imparting part that imparts a predetermined sensation to the operator, and a control part that controls the sensation imparting part to impart a sensation based on the robot state information to the operator if a delay time required from when the transmission part transmits the operator state information to when the reception part receives the robot state information is equal to or shorter than a predetermined time period, and controls the sensation imparting part to impart a sensation based on virtual state information indicating an estimated state of the robot to the operator if the delay time is longer than the predetermined time period, wherein the management apparatus includes:
- a delay specification part that specifies the delay time; and
- a notification part that notifies the control part about the delay time specified by the delay specification part, and wherein the delay specification part specifies a factor causing the delay time, the notification part instructs the sensation imparting apparatus to impart the sensation based on the virtual state information to the operator when the factor specified by the delay specification part is a transmission delay of the network, and the control part of the sensation imparting apparatus controls the sensation imparting part to impart the sensation based on the virtual state information to the operator.

11. The robot control system according to claim 10, wherein
- the notification part instructs the robot control apparatus to transmit virtual state information to the sensation imparting apparatus if the factor specified by the delay specification part is an operation delay of the robot, and
- the control part of the sensation imparting apparatus controls the sensation imparting part to impart the sensation based on the virtual state information received from the robot control apparatus to the operator.

12. A robot control method, the method comprising the computer-implemented steps of:
- transmitting operator state information indicating a state of an operator operating a robot to the robot;
- determining whether or not a delay time required from transmitting the operator state information to receiving robot state information indicating a state of the robot is equal to or less than a predetermined time period; and
- imparting a sensation based on the robot state information to the operator if the delay time is equal to or less than the predetermined time period, and imparting a sensation based on virtual state information indicating an estimated state of the robot to the operator if the delay time is longer than the predetermined time period, wherein the imparting step includes imparting, to the operator, a sensation interpolated between a first sensation based on the virtual state information and a second sensation based on the robot state information received by the reception part after imparting the sensation based on the virtual state information to the operator, if there is a difference of a predetermined magnitude or more between the first sensation and the second sensation.

* * * * *